US008971268B2

(12) United States Patent
Ryu et al.

(10) Patent No.: US 8,971,268 B2
(45) Date of Patent: Mar. 3, 2015

(54) METHOD AND APPARATUS FOR TRANSMITTING UPLINK DATA ASSOCIATED WITH MTC DEVICE TRIGGER FUNCTION

(75) Inventors: Ki Seon Ryu, Anyang-si (KR); Sang Gook Kim, San Diego, CA (US); Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 13/594,483

(22) Filed: Aug. 24, 2012

(65) Prior Publication Data

US 2013/0051338 A1  Feb. 28, 2013

Related U.S. Application Data (60) Provisional application No. 61/527,038, filed on Aug. 24, 2011.

(30) Foreign Application Priority Data

Aug. 24, 2012 (WO) ................ PCT/KR2012/006738

(51) Int. Cl.
*H04W 4/00* (2009.01)
*H04W 74/08* (2009.01)
*H04W 60/04* (2009.01)

(52) U.S. Cl.
CPC .............. *H04W 4/005* (2013.01); *H04W 74/08* (2013.01); *H04W 60/04* (2013.01)
USPC ............ 370/329; 370/338; 370/341; 370/348

(58) Field of Classification Search
CPC ..................................... H04W 4/005
USPC ................ 370/225, 311, 329, 341, 348, 338; 455/423, 456.1, 524
See application file for complete search history.

(56) References Cited

U.S. PATENT DOCUMENTS

| 2010/0099402 | A1* | 4/2010 | Wu .............................. 455/423 |
| 2011/0269499 | A1* | 11/2011 | Vikberg et al. .............. 455/524 |
| 2011/0292854 | A1* | 12/2011 | Terry et al. .................... 370/311 |
| 2012/0063300 | A1* | 3/2012 | Sahin et al. ................... 370/225 |
| 2012/0252481 | A1* | 10/2012 | Anpat et al. ............... 455/456.1 |

FOREIGN PATENT DOCUMENTS

KR  10-2011-0093581 A  8/2011

OTHER PUBLICATIONS

LG Electronics, "SMS optimization for Small Data Transmission", 3GPP TSG SA WG2 Meeting #85, S2-112590, May 16-20, 2011.
Nokia Siemens network, Nokia, "Small Data Transmission via NAS Signalling", 3GPP TSG SA WG2 Meeting #85, S2-112574, May 16-20, 2011.
Vodafone, "M2M:Small data transmission using optimizied SMS", 3GPP TSG SA WG2 Meeting #85, S2-112469, May 16-20, 2011.

* cited by examiner

*Primary Examiner* — Brian D Nguyen
*Assistant Examiner* — Toan Nguyen
(74) *Attorney, Agent, or Firm* — Birch, Stewart, Kolasch & Birch, LLP (57) ABSTRACT

A method and apparatus for small packet transmission in response to machine type communication (MTC) device trigger indication are provided. For uplink (UL) transmission of small packet from MTC device in idle state, a tracking area update (TAU) complete non-access stratum (NAS) message is used to protect integrity and confidentiality of UL small packet transmission without attach/service request procedure during idle state. For downlink (DL) transmission of small packet from MTC device in idle state, a TAU accept NAS message is used to protect integrity & confidentiality of DL small packet reception without attach/service request procedure during idle state.

18 Claims, 9 Drawing Sheets

METHOD AND APPARATUS FOR TRANSMITTING UPLINK DATA ASSOCIATED WITH MTC DEVICE TRIGGER FUNCTION

CROSS-REFERENCE TO RELATED APPLICATIONS

The present application for patent claims priority to Provisional Application No. 61/527,038 filed on Aug. 24, 2011, and International Application No. PCT/KR2012/006738 filed on Aug. 24, 2012, which are incorporated herein by reference.

BACKGROUND OF THE INVENTION

1. Field of the Invention

The technical features of this document relate to machine type communication (MTC) in wireless communications using a number of orthogonal frequency division multiple (OFDM) symbols, and more particularly, to a method and apparatus for handling MTC device triggering and small packet transmission.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication or machine-type communication (MTC) is the communication between machines that do not necessarily need human intervention. The 3GPP has started an effort to determine potential network optimizations that could lower the operational costs associated with offering these new M2M services.

SUMMARY OF THE INVENTION

A method and apparatus for small packet transmission in response to machine type communication (MTC) device trigger indication are provided. The method is performed by an MTC device which can be a terminal having MTC features.

In one aspect, the method comprises transmitting a first tracking area update (TAU) request message via radio resource control (RRC) signaling; receiving, in response to the first TAU request message, a first TAU accept message via RRC signaling, wherein the first TAU accept message includes an MTC device triggering indication which is transmitted from an MTC server; starting a random access procedure to transmit uplink data associated with the MTC device triggering indication; after starting the random access procedure, transmitting a second TAU request message via RRC signaling; receiving, in response to the second TAU request message, a second TAU accept message via RRC signaling; and transmitting, in response to the second TAU accept message, a TAU complete message together with the uplink data via RRC signaling.

In the method, the first TAU request message is transmitted in response to a paging received from a base station.

In the method, the first TAU request message to be delivered to a mobility management entity (MME) is encapsulated in an RRC connection setup complete message, which is transmitted to a base station.

In the method, the first TAU accept message is piggybacked with an MTC device trigger request, which is associated with the MTC device triggering indication.

In the method, the uplink data is generated in response to request indicated by the MTC device triggering indication.

In the method, the second TAU request message to be delivered to a mobility management entity (MME) is encapsulated in an RRC connection setup complete message, which is transmitted to a base station.

In the method, the uplink data is delivered to the MTC server via a mobility management entity (MME).

In the method, the MTC device triggering indication is delivered to a mobility management entity (MME) via an MTC interworking entity from the MTC server.

In the method, the second TAU request message includes an indicator for the uplink data and does not include the uplink data.

In the method, wherein the second TAU request message is not ciphering protected.

In another aspect, a method of transmitting data in a wireless communication system, the method performed by a machine type communication (MTC) device is further introduced. The method comprises performing a random access procedure to a base station (BS); transmitting a first tracking area update (TAU) request message via radio resource control (RRC) signaling; receiving, in response to the first TAU request message, a first TAU accept message via RRC signaling, wherein the first TAU accept message includes an MTC device triggering indication which is transmitted from an MTC server; retaining, in response to the first TAU request message, an RRC context which is obtained during the random access procedure; while retaining the RRC context, receiving a grant message to transmit uplink data associated with the MTC device triggering indication; and transmitting, in response to the grant message, a Non-Access Stratum (NAS) message including the uplink data associated with the MTC device triggering indication.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
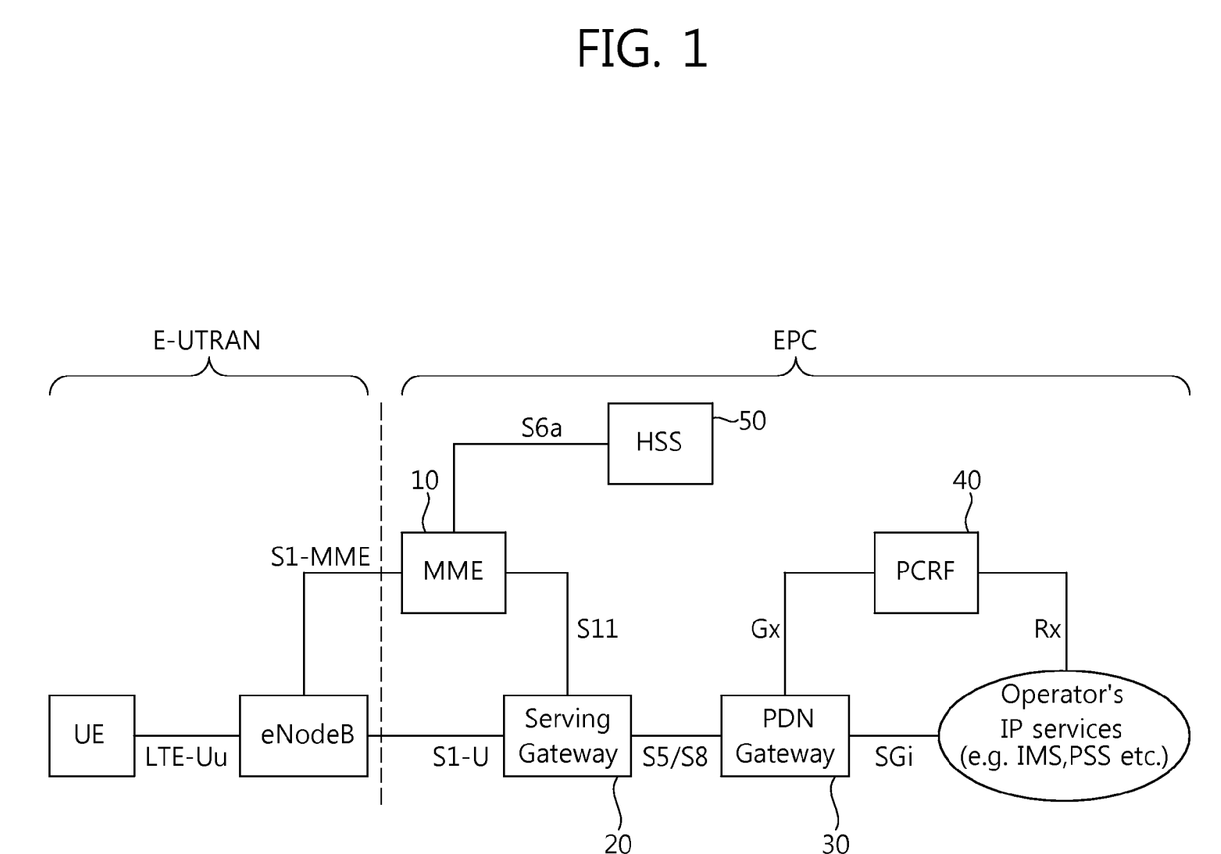
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
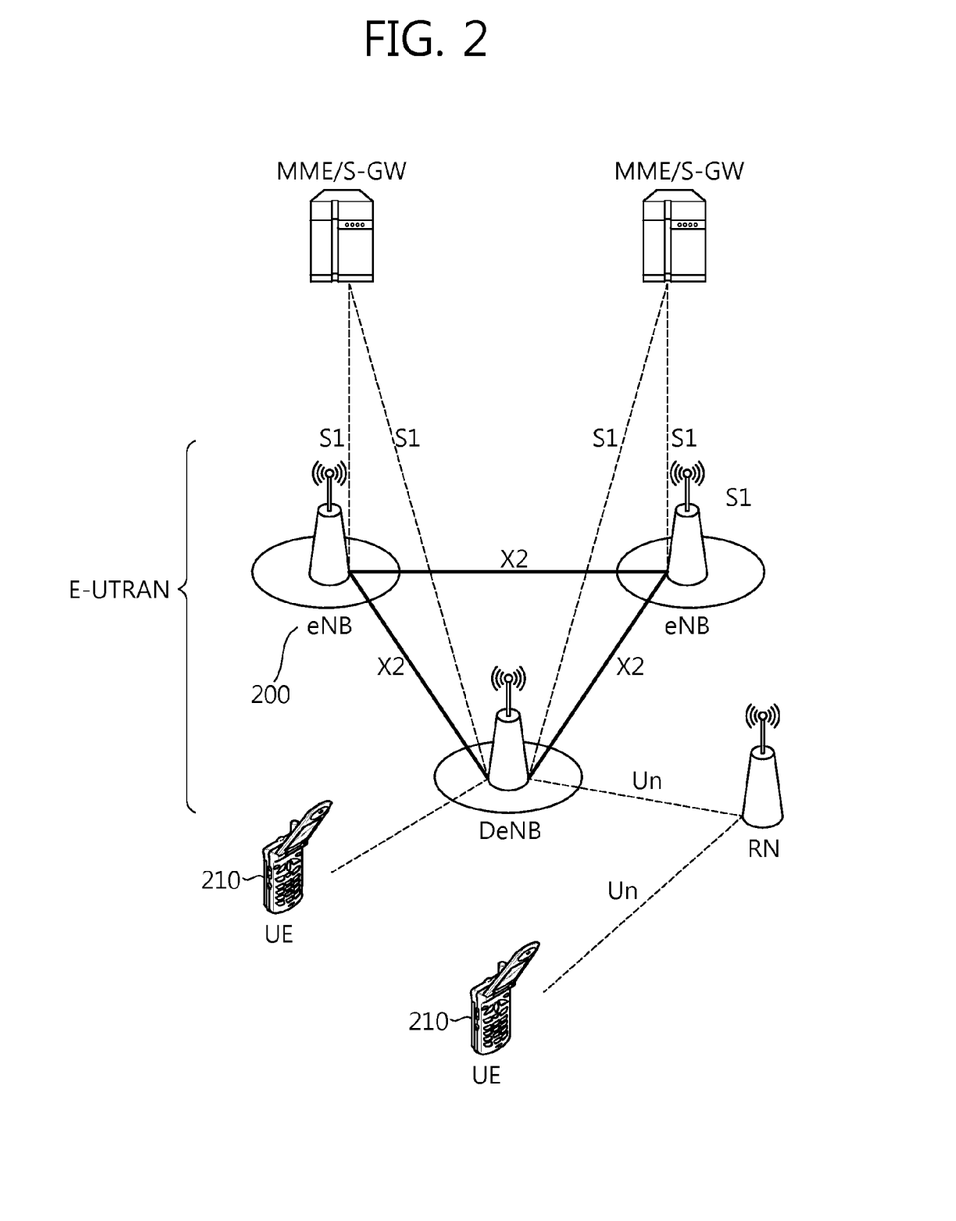
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Hereinafter, the concept of mobility management (MM) and a mobility management (MM) back-off timer is explained in detail. All UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update (TAU)', and a similar procedure is also defined in a universal terrestrial radio access network (UTRAN) or GSM EDGE Radio Access Network (GERAN) system and is called a 'Routing Area Update (RAU)'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in UE registered tracking area(s) (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

Here, features related to machine-type communication (MTC) are further explained. As discussed above, MTC is the communication between machines that do not necessarily need human intervention, and the 3GPP has started an effort to determine potential network optimizations. The MTC, which is also referred to as machine-to-machine (M2M), is expected to have applications in areas, such as smart metering, home automation, e-Health, fleet management, etc.

MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices. Hereinafter, the UE with MTC features is referred to as an MTC device.

Figure 3:
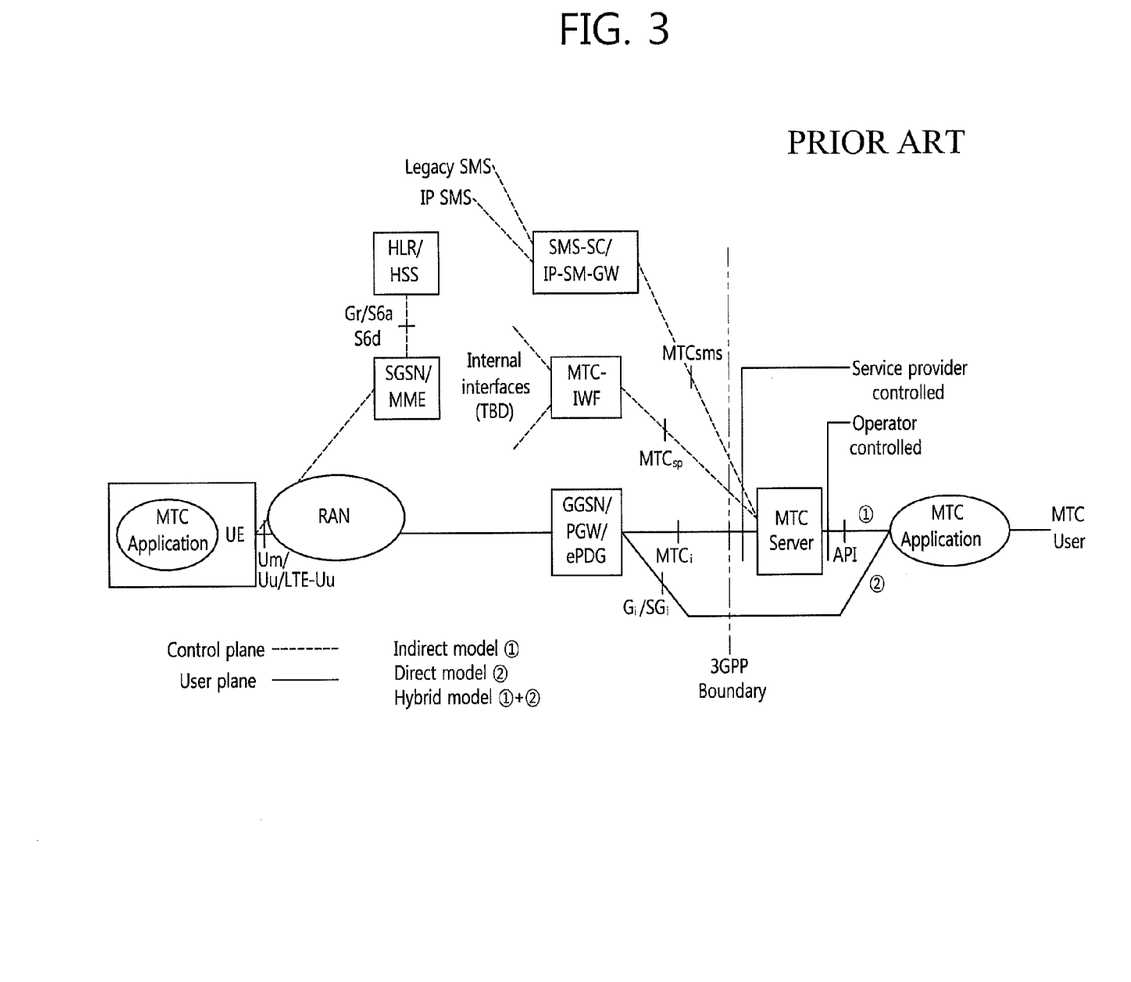
FIG. 3 depicts 3GPP architecture to which the MTC device trigger indication and small packet transmission features are applied.

The present description is related to a number of MTC features such as MTC device trigger and small packet transmission. Such features are specified in 3GPP TR23.888. FIG. 3 depicts 3GPP architecture to which the MTC device trigger and small packet transmission are applied.

As specified in 3GPP TR23.888, for many M2M applications, there may be an interest to have poll model for communications between MTC devices and the MTC server. This may be because the MTC user wants to be in control of communication from MTC devices, and does not allow MTC devices to randomly access the MTC server. Also for applications where normally the MTC devices initiate communications, there may occasionally be a need for the MTC server to poll data from MTC devices.

As specified in Section 5.8.2, 3GPP TR23.888, some functionalities needs to be considered:
The main characteristic of the device trigger feature is the 'control plane' interaction between the MTC Server and the 3GPP system that initiates all necessary functions or procedures within the 3GPP system and towards the MTC Server to enable the MTC Server to send user plane data towards the MTC Device.
Any triggering activity on MTC application level, which results in traffic being transferred by the 3GPP system transparently as user plane data, is not considered as device trigger (feature).
An MTC device shall be able to receive trigger indications from the network and establish communication with the MTC server when receiving the trigger indication. Possible options are:
  receiving trigger indication in detached state and establish communication.
  receiving trigger indication in attached state and the MTC device has no PDP/PDN connection.
  receiving trigger indication in attached state and the MTC device has a PDP/PDN connection.

Figure 4:
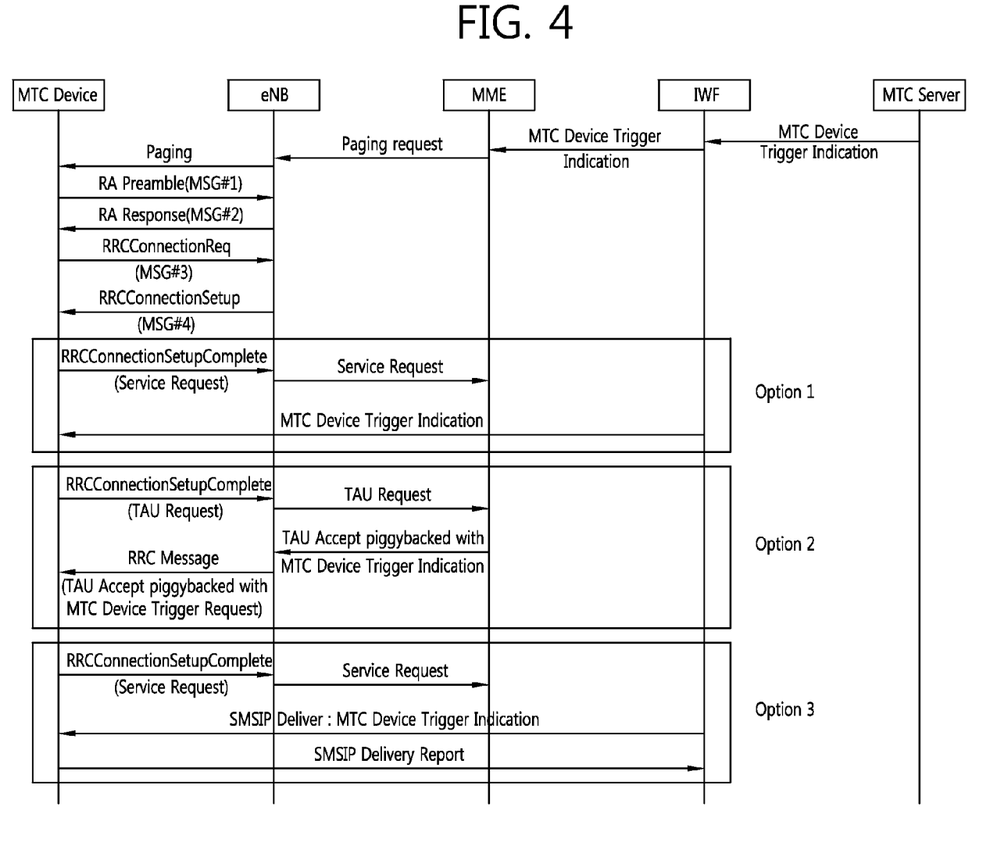
FIG. 4 depicts possible options for delivery of MTC device trigger indication.

FIG. 4 depicts possible options for delivery of MTC device trigger indication. As depicted in FIG. 4, in order to deliver the MTC device trigger indication from the MTC server to the MTC device which communicates with the eNB, the MTC device trigger indication should be delivered to a proper MME. Since an MTC device's internal address, which indicate the MTC device in 3GPP domain, is not known to the MTC server to which only an external address is known, interworking function (IWF) serves to enable the MTC device trigger indication to be delivered to a proper MME by using mapping between the internal and external addresses. The MME which has received the MTC device trigger indication pages the MTC device through the eNB. In response to the paging, the MTC device first performs a random access (RA) procedure. After completion of the RA procedure, the MTC device may perform one of Options 1-3 depicted in FIG. 4. However, Options 1-3 of FIG. 4 have the following technical problems.

As depicted in Option 1 of FIG. 4, the MTC device may perform a conventional 'service request procedure' to receive the 'MTC device trigger indication'. Namely, the MTC device trigger indication can be delivered as normal (or usual) downlink data. However, Option 1 depicted in FIG. 4 has following issues:
  require user plane (U-Plane) setup for MTC Device to receive DL data of MTC device trigger indication.
  After receiving DL data (i.e., MTC device trigger indication) and exchanging data related to MTC device trigger function, it requires state change of MTC device (i.e. connected to idle).
  Even though MTC device trigger is specified as control plane interaction between MTC server and 3GPP system, MTC Device Trigger can be delivered to MTC device with 3GPP system transparently as user plane data without control plane interaction between MTC Server and 3GPP system.

Referring to Option 2 of FIG. 4, the MTC device may use NAS signalling (e.g., TAU request/accept). However, Option 2 depicted in FIG. 4 has following issues:
  to be defined which NAS message is used.
  to be defined how to encapsulate MTC application data in NAS message.
  Although MTC Device Trigger usually trigger UL data (e.g., MTC application report), it does not address how to exchange additional traffic and which state MTC device is in for this.
  Security perspectives (e.g., Mutual Authentication, Related Security Key Update, and ciphering & integrity protection of the data related to MTC device trigger function, etc.,) are not considered.
  RAN aspect (e.g., Addressing such as C-RNTI assignment and release, Timer related operation, etc.,) is not considered.

Figure 5:
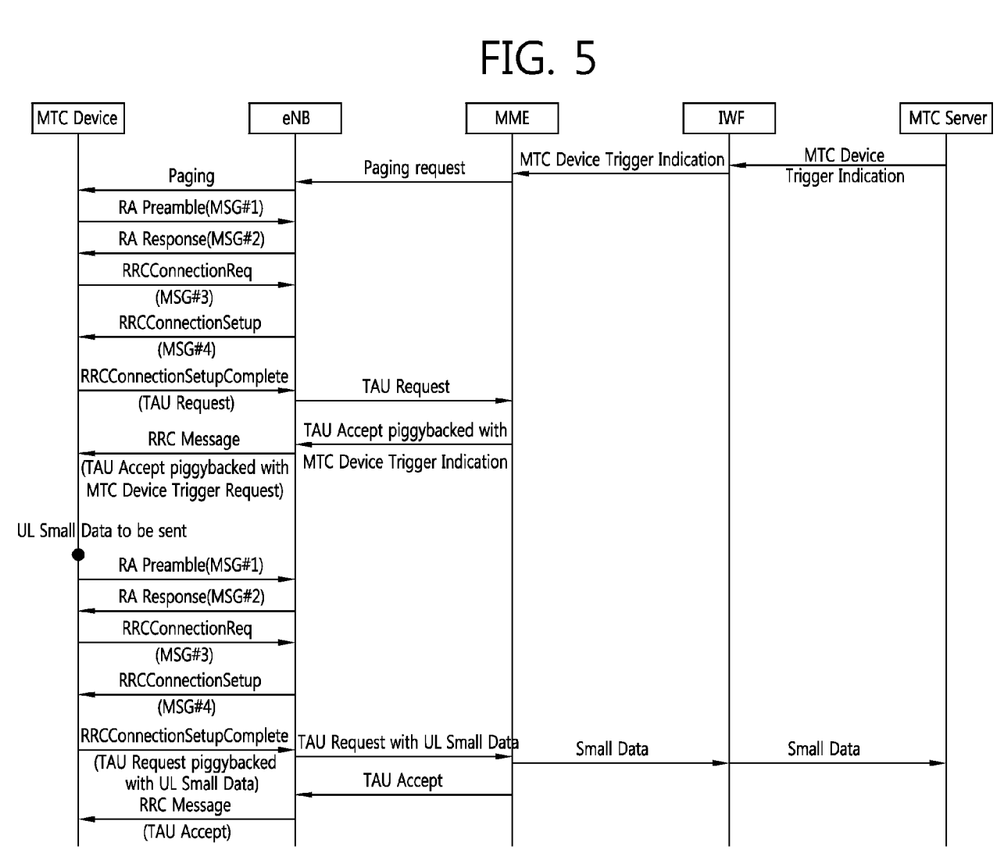
FIG. 5 depicts one available delivery method based on NAS messages.

In Option 3 of FIG. 4, the MTC device may use Short Message Service (SMS) for delivery of MTC device trigger indication. However, Option 3 depicted in FIG. 4 has following issues:
  require additional signaling overhead to use SMS (over IP/IMS).
  require user plane (U-Plane) setup for MTC Device to receive DL data of MTC device trigger indication FIG. 5 depicts one available delivery method based on NAS messages. In particular, FIG. 5 proposes a hypothetical embodiment using NAS messages related to TAU procedure to deliver uplink data related to MTC Device Trigger function. It should be noted that there are various discussions in favor of and against examples depicted in FIG. 5. The arguments in favor of FIG. 5 consider the following issues:

MTC device does not need to establish RRC security because NAS security is only applied for ciphering and integrity protection of small data related to MTC Device Trigger function.

TAU procedure is performed while MTC device is in idle state, so MTC device does not need to change its state to send/receive the data related to MTC Device Trigger function.

Meanwhile, the arguments against FIG. 5 consider the following issues:

After receiving MTC device trigger request via TAU procedure, MTC device has to perform random access and TAU procedure again to send UL data because MTC device trigger request normally triggers the MTC device sending UL data (e.g., MTC application data in response to the MTC device trigger indication)

TAU accept is ciphered and integrity protected but TAU request is only integrity protected. NAS messages piggybacked with DL MTC data (i.e., MTC device trigger indication) is not only ciphered but integrity protected, but UL MTC data (i.e., MTC device trigger response, or MTC application data for report) is only integrity protected.

Regarding the problems of integrity protection of TAU Request, there has been a proposal ('Efficient small data transmission', SA WG2 Meeting #86, S2-113826) of new NAS message information element (IE) encapsulating IP packet of small MTC data with ciphering and integrity protection. However, it is evident that such approach would only increase complexity of NAS message encoding/decoding, and security header type would not support this partial ciphering/integrity protection of NAS message. Further, it should be noted that to skip security mod control, the UE and MME has to perform mutual authentication with MAC-I.

Therefore, the present description suggests that integrity only protection of initial uplink NAS message (e.g., TAU request, Service Request, etc.) is more effective than the aforementioned approach. Namely, present description proposes a method of handling MTC Device Trigger which can solve technical problems of Option 2 by using a uplink NAS message in which integrity protection is guaranteed.

For mobile originated (MO) or uplink small packet, the present description proposes to use a TAU complete message, which is transmitted by the MTC device in response to a certain TAU accept message. In other words, the present description uses the TAU complete message to protect integrity and confidentiality of UL small packet transmission without performing attach or service request procedure during the MTC device's idle state. Whereas the FIG. 5 uses the TAU request message to deliver UL data (or UL small packet), the present description provides FIGS. 6-7 which does not use the TAU request, which is only integrity protected, to deliver the UL data.

For mobile terminated (MT) or downlink small packet, the present description proposes to use a TAU accept message, which is transmitted from the eNB in response to a TAU request message from the MTC device. It should be noted that the TAU accept message is used to protect integrity and confidentiality of the downlink small packet reception without attach/service request procedure during the MTC device's idle state.

Figure 6A:
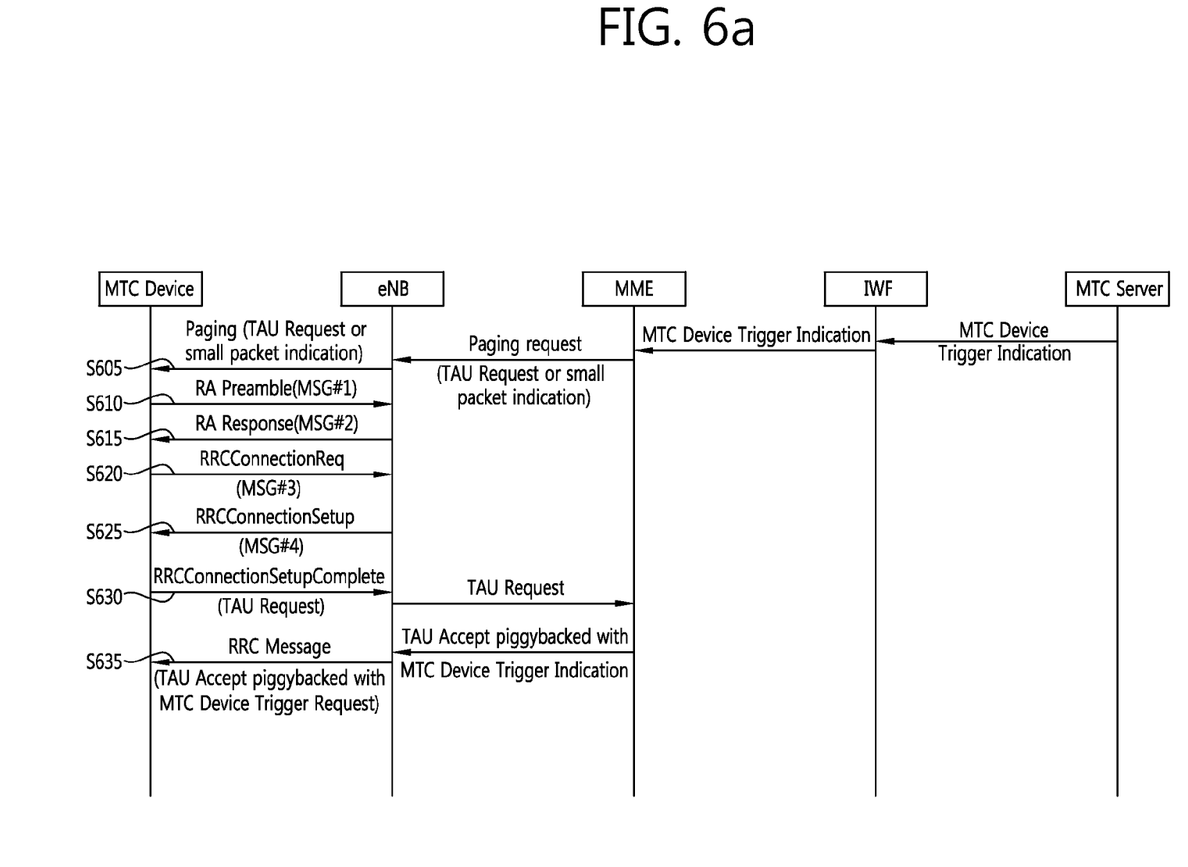
FIGS. 6a and 6b depict one example in which the TAU complete message is used to transmit uplink data to the MTC server.
Figure 6B:
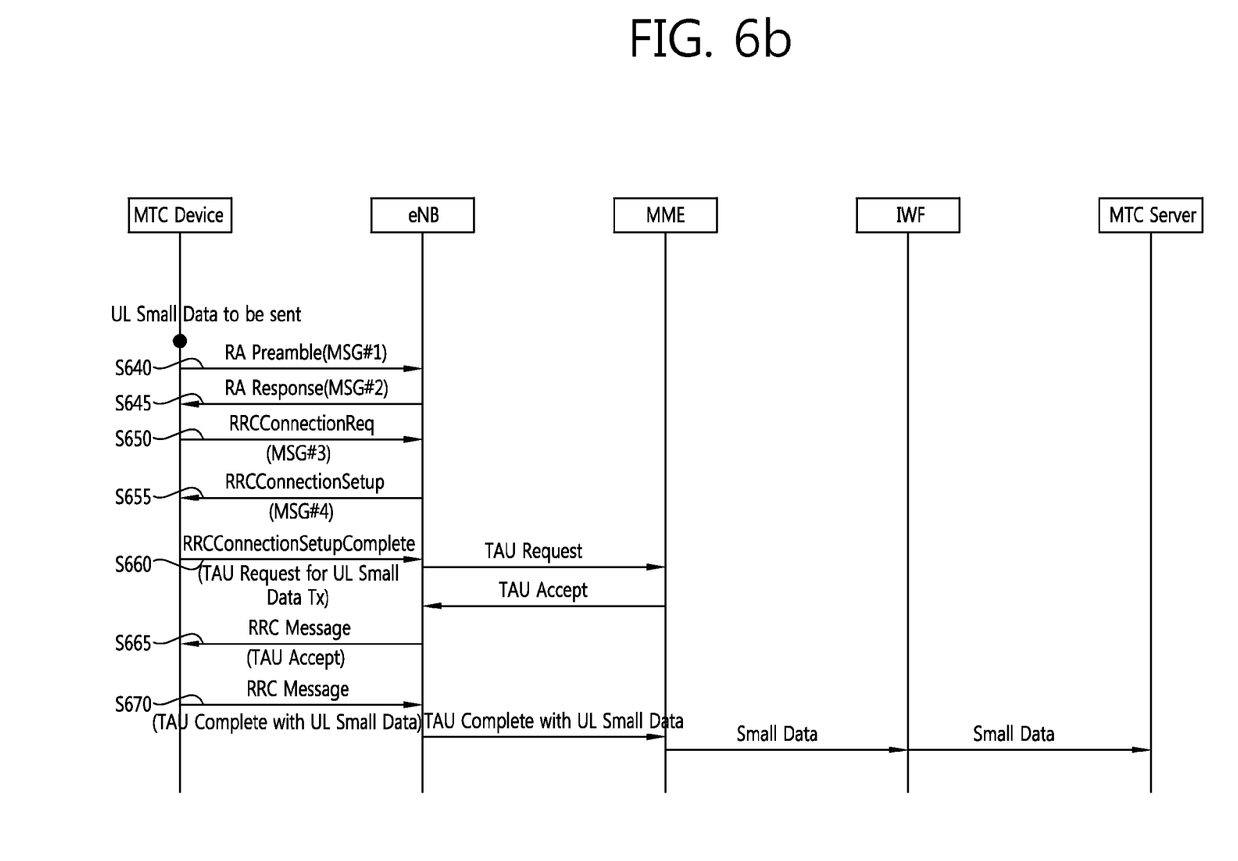

FIGS. 6a and 6b depict one example in which the TAU complete message is used to transmit uplink data to the MTC server.

Once the MTC server generates MTC device trigger indication for a certain MTC device, the MTC device trigger indication should be delivered to the MTC device via the IWF, MME, and eNB. The MTC device trigger indication may require the MTC device to report some uplink small data.

In order for the MTC device in the idle state to receive the MTC device trigger indication, a paging can be delivered first. As depicted in steps S610-S630, a first random access procedure is performed to respond the paging. In FIGS. 6a-6b, while reception of the paging is not necessarily required, the first random access procedure can be initiated in response to a paging of S605. In particular, as shown steps S605-S630, once the MTC device is paged with TAU/small packet indication, it transmits a TAU request message via RRC signaling (i.e., RRC connection setup complete message).

Since the TAU request message of S630 is a NAS message encapsulated in RRC signaling, it is eventually delivered to the MME. After the MME which received the TAU request piggybacks a TAU accept message with the MTC device trigger indication, the MTC device trigger indication with the TAU accept message is delivered to the MTC device by using RRC signaling (S635).

In response to the MTC device trigger indication, the MTC device may prepare transmission of uplink small data/packet. For instance, the uplink small data can be reporting information to be delivered to the MTC server. The contents of the uplink small data can be determine based on the MTC device trigger indication. Although, for clarity of explanation, the uplink small data is illustrated between S635 and S640 in FIGS. 6a-6b, the uplink small data associated with the MTC device trigger indication can be generated at any phase of FIGS. 6a-6b. For instance, it can be generated after reception of the MTC device trigger indication, or prior to reception thereof.

Once the MTC device trigger indication is delivered and the uplink data is prepared, the MTC performs a random access procedure (S640-S655). After receiving a contention resolution message (i.e., RRC connection setup message or MSG#4), the MTC device transmits the TAU request message via RRC signaling, i.e., RRC connection setup complete message (S660). Although the TAU request message is a NAS message and is eventually delivered to the MME, it is encapsulated in the RRC connection setup complete message, which is delivered to the eNB. After the NAS message (i.e., TAU request message for transmission of uplink small data) is delivered to the MME, the MTC device receives RRC signaling including a TAU accept message in response to the TAU request message (S665). In response to the TAU accept message of S665, the MTC device to transmits the TAU complete message together with the uplink data via RRC signaling (S670). As discussed above, while the RRC signaling is delivered to the eNB, the NAS message (i.e., TAU complete message with the uplink data) is delivered to MME, whereby the uplink data can be delivered to the MTC server via the MME.

It should be noted that the uplink small data is user data and is transmitted via user plane in conventional art, but the present description proposes a method of transmitting the uplink small data via NAS signalling (i.e., TAU complete message), which is associated with control plane. As discussed above, while the TAU request message has technical problems where ciphering protection is not provided, the TAU complete message carrying the uplink small data is ciphering and integrity protected.

Figure 7:
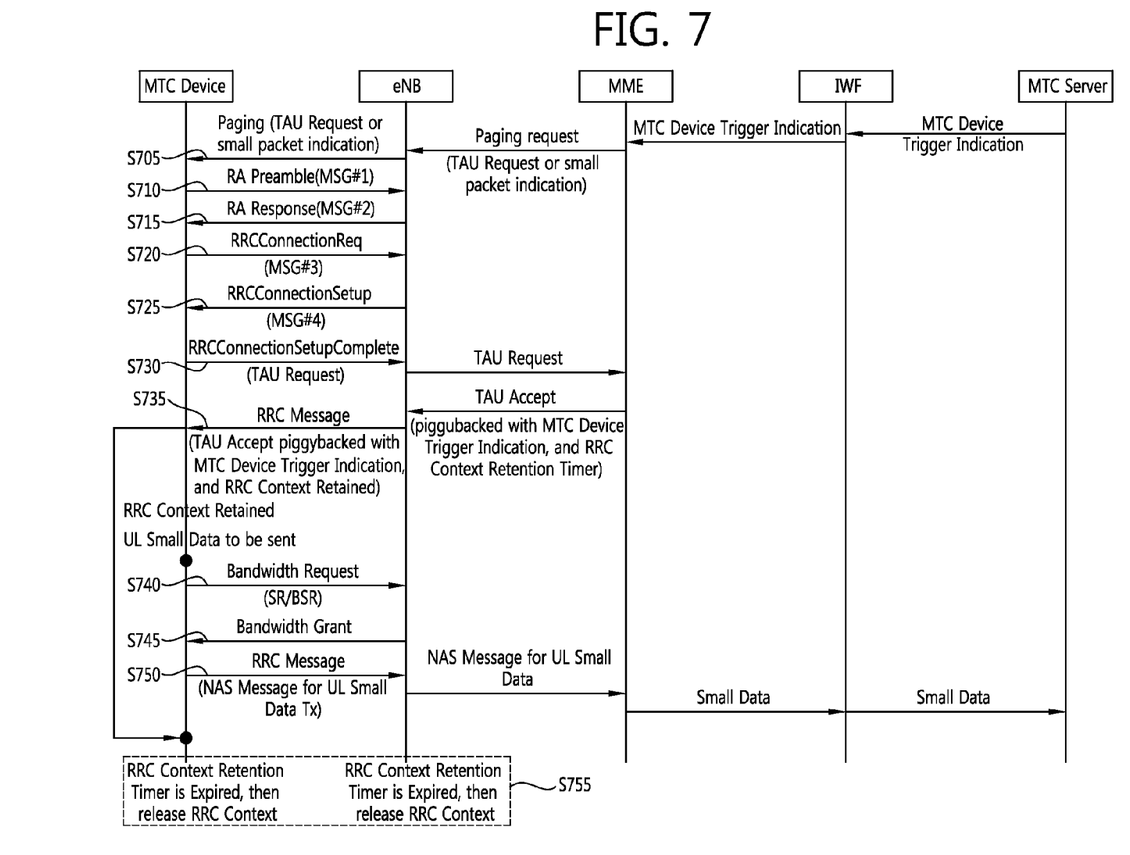
FIG. 7 depicts another example in which a certain NAS message is used to transmit uplink data from the MTC device to the MTC server.

FIG. 7 depicts another example in which a certain NAS message is used to transmit uplink data from the MTC device to the MTC server.

Procedures of FIG. 7 related to the paging and random access are similar to those of FIGS. 6a-6b. In particular, steps depicted in S705-S730 are corresponding to S605-S630.

In FIG. 7, after receiving the paging or TAU accept message indicating MTC device trigger indication, MTC device may retain its RRC context such as Cell Radio Network Temporary Identifier (C-RNTI) temporarily to send successive UL small packet after performing TAU to receive DL small packet (i.e., MTC device trigger indication). It should be noted that the MTC device trigger indication can be formatted with various indication name and meaning such as 'Small Packet Tx indication', 'Temporarily RRC context retention after TAU', etc. In this case, the MTC device may not use random access channel and C-RNTI (i.e., DCCH for second TAU procedure) which can be used to send successive UL small packet.

As illustrated in S735-S755, FIG. 7 discloses a method of retaining RRC context by using a 'RRC context retention timer'. However, various mechanism to be explain below can be used to retain the RRC context, and thus the present description is not limited thereto.

In Step S735, the TAU accept message may include piggybacked MTC device triggering indication which is delivered from the MTC server. Further, in case where the 'RRC context retention timer' is used, timer information on the RRC context retention timer is also included in the TAU accept message.

In response to reception of the timer information, the RRC context retention timer is started based on the timer information, and the RRC context is retained by the MTC device during which the RRC context retention timer is running at the MTC device. The RRC context includes RRC related information obtained during steps S710-S725. For instance, the RRC context includes C-RNTI given by MSG#2 and MSG#4, HARQ status information, RRC related timer information, etc.

Compared to FIGS. 6a-6b, an example of FIG. 7 does not require additional random access procedure to transmit the uplink small data, since the RRC context is maintain by the MTC device. Once the uplink small data is prepared to be transmitted, the MTC device can transmit a bandwidth request for scheduling request of the uplink small data (S740). After bandwidth for the uplink small data is granted by the eNB, the MTC device transmit a NAS message including the uplink small data via RRC signaling (S745-S750). As discussed above, while the RRC signaling is delivered the eNB only, the uplink small data is delivered to the MME, since the NAS message is used. Therefore, the MME forwards the uplink small data to the MTC server which transmits the MTC device triggering indication.

After the uplink small data is successfully transmitted through a NAS message encapsulated in a RRC message, the RRC context retention timer can be expired at both MTC device and eNB. Then, the RRC context can be released at both the MTC device and eNB. Examples of the NAS message which transmits the uplink small data include a TAU-related message (e.g, TAU complete message) and NAS transport messages defined in Sections 5.6.3 and 5.6.4 of 3GPP TS 24.301.

Instead of the 'RRC context retention timer', an indicator representing 1-bit information can be used to retain the RRC context. In particular, the MTC device may receive 1-bit indicator (retention indication information) which enables the MTC device to retain the RRC context. Once the uplink small data is successfully transmitted through the aforementioned NAS message, the MTC device transmits another 1-bit indicator (release indication information) to enable the MTC device to release the RRC context.

In sum, the present description supports the MTC device trigger function/feature by using TAU procedure. To implement features disclosed above, new NAS message IE (i.e., for encapsulating DL/UL small IP packet related to MTC device trigger feature) can be defined in 3GPP standard documents. A new RRC establishment cause (i.e., not using conventional causes such as Tracking Area Update) can be also defined in 3GPP. Further, new reason of sending Tracking Area Update Complete message can be defined in 3GPP. For instance, it can be recited as 'TAU Complete shall be sent by the UE to the network in response to a tracking area update accept message if a GUTI has been changed or a new TMSI has been assigned or piggybacked small packet (i.e., the above-mentioned uplink small data) is sent by UE'.

Figure 8:
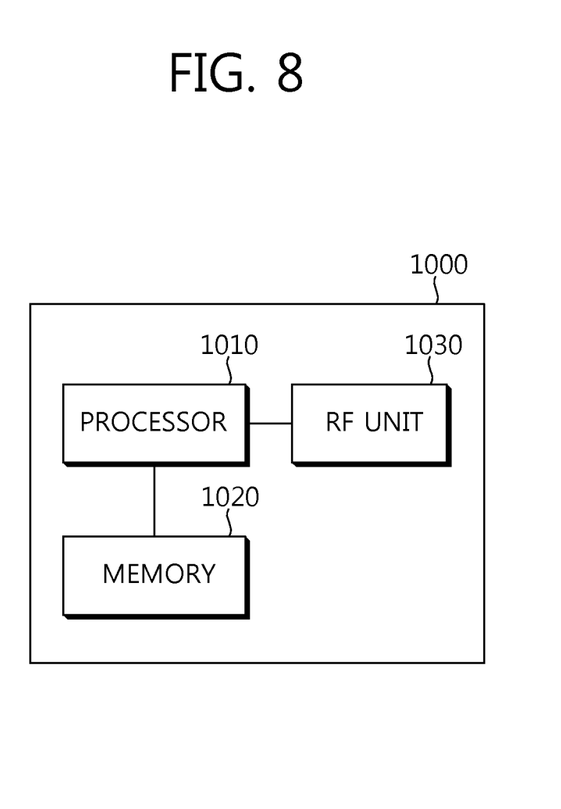
FIG. 8 is a block diagram showing a wireless apparatus to implement technical features of this description.

FIG. 8 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. La yers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting data in a wireless communication system, the method performed by a machine type communication (MTC) device and comprising:

transmitting a first tracking area update (TAU) request message via radio resource control (RRC) signaling;

receiving, in response to the first TAU request message, a first TAU accept message via RRC signaling, wherein the first TAU accept message includes an MTC device triggering indication which is generated by and transmitted from an MTC server;

starting a random access procedure when there is an uplink data associated with the MTC device triggering indication;

after starting the random access procedure, transmitting a second TAU request message via RRC signaling;

receiving, in response to the second TAU request message, a second TAU accept message via RRC signaling; and transmitting, in response to the second TAU accept message, a TAU complete message together with the uplink data via RRC signaling.

2. The method of claim 1, wherein the first TAU request message is transmitted in response to a paging received from a base station.

3. The method of claim 1, wherein the first TAU request message to be delivered to a mobility management entity (MME) is encapsulated in an RRC connection setup complete message, which is transmitted to a base station.

4. The method of claim 1, wherein the first TAU accept message is piggybacked with an MTC device trigger request, which is associated with the MTC device triggering indication.

5. The method of claim 1, wherein the uplink data is generated in response to request indicated by the MTC device triggering indication.

6. The method of claim 1, wherein the second TAU request message to be delivered to a mobility management entity (MME) is encapsulated in an RRC connection setup complete message, which is transmitted to a base station.

7. The method of claim 1, wherein the uplink data is delivered to the MTC server via a mobility management entity (MME).

8. The method of claim 1, wherein the MTC device triggering indication is delivered to a mobility management entity (MME) via an MTC interworking entity from the MTC server.

9. The method of claim 1, wherein the second TAU request message includes an indicator for the uplink data and does not include the uplink data.

10. The method of claim 1, wherein the second TAU request message is not ciphering protected.

11. A method of transmitting data in a wireless communication system, the method performed by a machine type communication (MTC) device and comprising:

performing a random access procedure to a base station (BS);

transmitting a first tracking area update (TAU) request message via radio resource control (RRC) signaling;

receiving, in response to the first TAU request message, a first TAU accept message via RRC signaling, wherein the first TAU accept message includes an MTC device triggering indication which is which is generated by and transmitted from an MTC server;

retaining, in response to the first TAU request message, an RRC context which is obtained during the random access procedure when there is an uplink data associated with the MTC device triggering indication;

while retaining the RRC context, receiving a grant message to transmit the uplink data associated with the MTC device triggering indication; and transmitting, in response to the grant message, a Non-Access Stratum (NAS) message including the uplink data associated with the MTC device triggering indication.

12. The method of claim 11, wherein the first TAU accept message is piggybacked with the MTC device triggering indication and includes timer information on RRC context retention timer, wherein the RRC context retention timer is started based on the timer information, wherein the RRC context is retained by the MTC device during which the RRC context retention timer is running at the MTC device.

13. The method of claim 12, further comprising:
transmitting a bandwidth request for the uplink data; and
receiving, in response to the bandwidth request, a bandwidth grant for the uplink data.

14. The method of claim 13, further comprising:
releasing the RRC context after the RRC context retention timer is expired.

15. The method of claim 11, further comprising:
receiving retention indication information enabling the MTC device to retain the RRC context; and
after transmitting the uplink data, releasing the RRC context and transmitting release indication information.

16. The method of claim 11, wherein the RRC context includes Cell Radio Network Temporary Identifier (C-RNTI) of the MTC device.

17. The method of claim 11, wherein while retaining the RRC context the uplink data is transmitted via the NAS message without performing additional random access procedure.

18. The method of claim 11, wherein the NAS message includes a TAU complete message.

* * * * *